United States Patent Office 3,062,665
Patented Nov. 6, 1962

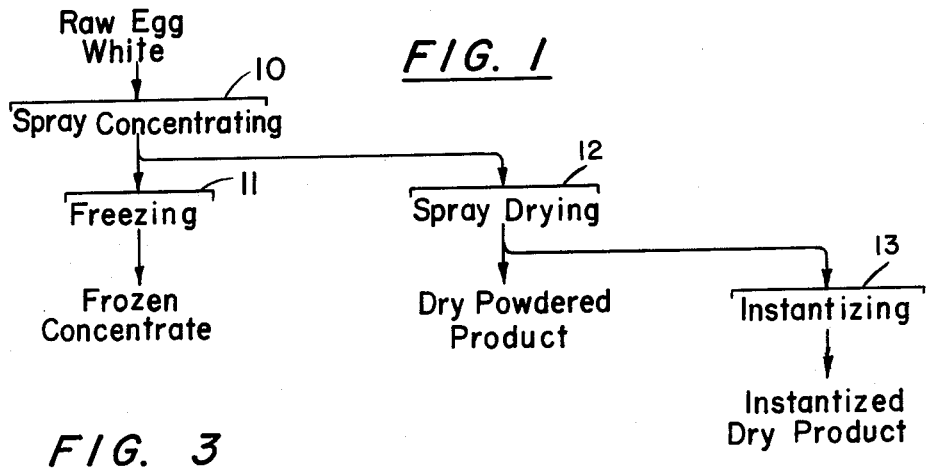
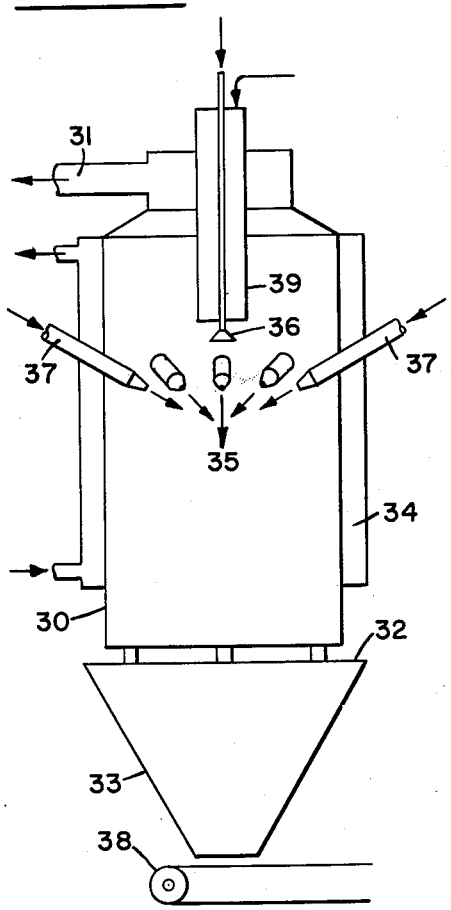
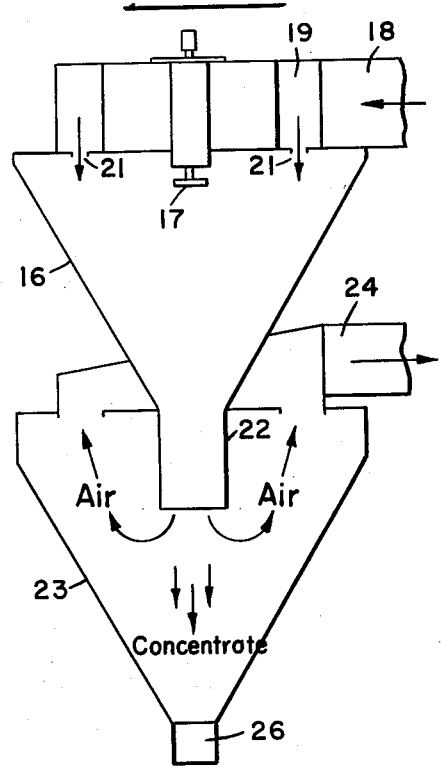

3,062,665
METHOD OF PRODUCING A PRESERVED EGG WHITE PRODUCT
David D. Peebles, Davis, and Paul D. Clary, Jr., Petaluma, Calif., assignors to Formost Dairies, Inc., San Francisco, Calif., a corporation of New York
Filed July 8, 1959, Ser. No. 825,848
6 Claims. (Cl. 99—210)

This invention relates generally to preserved egg white products and processes for manufacturing the same.

Certain animal proteins like egg white are highly susceptible to denaturing, due presumably to the complex long chain character of their protein molecules. Various conventional processing operations, when applied to raw egg white to produce a preserved concentrate or dry product, cause more or less denaturing. Denaturing is readily detectable when the product is reconstituted with water, because the reconstituted material has properties which differ considerably from the original raw material, such as differences in physical appearance, the development of an impaired or off-flavor and differences in viscosity and whipping properties. While preserved egg white products have been widely used in the bakery and confection industries, the changes due to denaturing seriously impair their usefulness and their range of application.

In general, it is an object of the present invention to provide a process for the production of preserved egg white products which does not cause any material denaturing of the protein.

Another object of the invention is to provide a process of the above character which is relatively simple and inexpensive to apply, and which does not apply any treatment chemical.

Another object of the invention is to provide a process of the above character which results in a dry divided egg white product which can be reconstituted with water to form a material that is substantially identical with the original raw egg white.

Another object of the invention is to provide a process of the above character which produces an instantized dry divided material, which is readily wettable and easily reconstituted with water.

Another object of the invention is to provide a novel preserved egg white product including a concentrate, a dry egg white powder, and a dry granular instantized product.

Additional objects and features of the invention will appear from the following description in which the preferred embodiments have been set forth in detail in conjunction with the accompanying drawing.

Referring to the drawing:

FIGURE 1 is a flow sheet illustrating one procedure for carrying out the process.

FIGURE 2 is a schematic side elevation in section illustrating equipment for carrying out the concentrating operation.

FIGURE 3 is a schematic side elevation in section illustrating suitable instantizing equipment.

The present invention is predicated upon our discovery that when egg white is sprayed into contact with a drying gas, evaporation of moisture from the droplets occurs without any material denaturing of the complex proteins. In the present process such spray concentration is applied to provide a semi-fluid concentrate which thereafter may be frozen, dried or otherwise treated to form a preserved product. We have further discovered that after concentration by the spray method, the resulting semi-fluid material can be spray dried in conventional desiccating or spray drying equipment to produce a novel dry divided product characterized by the absence of denatured protein. As will be presently explained, such a dry divided product can be used as such, or can be converted to a product having "instant" properties.

The procedure illustrated in FIGURE 1 of the drawing consists of supplying raw egg white to a spray concentrating operation 10. In this operation the egg white is sprayed into a treatment zone to which a drying gas (e.g. warm air) is supplied. The droplets thus brought into contact with the drying gas may range from about 10 to 200 microns in diameter. Moisture is evaporated from the spray droplets whereby when the droplets leaving the treatment zone are collected, they form a semi-fluid concentrate having considerable increased viscosity compared to the original raw egg white.

In a typical instance, the raw egg white supplied to the process may contain 9% solids. After concentration by the spray method, the resulting semi-fluid material may contain from 30 to 35% solids. To attain this degree of concentration, the egg white may be continually recirculated through the treatment zone, through which the material passes progressively.

The concentrate from operation 10 can be used as such but preferably is treated to produce stable preserved products. As indicated by step 11, the concentrate can be subjected to low temperature freezing to produce a frozen concentrate capable of keeping without spoilage or deterioration for an indefinite period of time. When it is desired to use such a frozen concentrate, it is permitted to thaw, and thereafter reconstituted with water or mixed with other liquid ingredients.

As indicated by step 12, the concentrate can be subjected to spray drying by the use of conventional spray drying equipment to produce a dry powdered product having a moisture content of the order of from 5% to 12% (total). Due presumably to the viscosity of the concentrate, the dry powder has a bulk density substantially greater than powder produced by spray drying egg white instant concentration.

As indicated by step 13, such spray dried powder can be subjected to an instantizing operation to produce a dry divided product having instant characteristics. As will be presently explained, the instantizing operation can consist of passing the powder, in dispersed condition, through a treatment zone, where moisture is applied to the particles to make them sticky. The moist powder particles are brought into random contact, thereby forming moist porous aggregates. The collected moist porous aggregates are subjected to drying to produce the final dry instantized product. In a typical instance, the particle size of the instantized product can be such that the bulk of the material will pass through a 20 mesh screen, but will remain upon a 100 mesh screen.

Each of the products produced by the procedure of FIGURE 1 is characterized by substantially complete absence of denatured protein. This is attributed to the use of the spray concentrating method in step 10, which in contrast with other evaporating or drying methods, does not cause any material amount of protein denaturing. Apparently evaporation of moisture from the spray droplets does not, for reasons which are not clearly understood, cause protein denaturing. Conventional evaporating methods, such as atmospheric or vacuum evaporators or film dryers cause serious denaturing when applied to egg white. As previously indicated, the spray drying of such a concentrate produces results which cannot be produced by the direct spray drying of the raw egg white. When raw egg white is directly spray dried, the resulting product consists of a fluffy powder of low bulk density (e.g. 270–350 grams per liter) which is expensive to package. It has relatively poor wettability, and when it is attempted to mechanically intermix it with water, the mixture is subject to foaming. The denser powder (e.g. bulk density 450–600 grams per liter) obtained by the spray drying of the concentrate can more readily be dispersed in water to form a reconstituted egg white without serious foaming. Furthermore, the fluffy powder produced by the direct spray drying of raw egg white does not lend itself to forming an instantized product without additives. In contrast, the denser product obtained by spray drying the concentrate readily lends itself to instantizing as by use of the method herein described.

Suitable apparatus is shown in FIGURE 2 for carrying out the spray concentrating method. It consists of a vertical conical shaped chamber 16 provided with a centrifugal spray head 17, to which the egg white is supplied. Hot air is supplied through duct 18 and distributed by manifold 19 through the tangentially directed and louvered openings 21, into the upper part of the chamber and in a zone surrounding the atomizer head. The collected concentrate is delivered through the lower conduit 22 into the collecting cone 23, which has its upper end connected to the air discharge conduit 24, and its lower end provided with a discharge conduit 26. In the operation of such equipment, the spray head 17 is operated to produce a spray of the desired droplet size, and the spray droplets are thrown outwardly and caused to be deflected downwardly by the air currents, with some swirling about the vertical axis of the chamber. The majority of the droplets collect and form a continuous fluid film upon the inner surfaces of the side of chamber walls, and this film continuously flows downwardly over the side walls and through the conduit 22. The air inlet and outlet temperatures are so selected as to avoid undue heating of the material. For example, in a typical instance the air inlet may be at a temperature of the order of 250° F., and the air outlet at a temperature of 110° F. As previously mentioned the collected concentrate may be recirculated through such equipment until the desired concentration is obtained.

FIGURE 3 shows suitable equipment for carrying out the instantizing operation. It consists of a vertical chamber 30 having a downwardly extending inlet conduit 39 for introducing the powdered material as conveyed pneumatically from a convenient supply hopper. Some air is removed through conduit 31 whereby some atmospheric air is drawn into the chamber through the lower opening 32 between the main part of the chamber and the discharge hopper 33. The sides of the chamber can be kept warm by circulating warm air through the jacket 34, thereby preventing the condensing of moisture on the inner chamber surfaces. The powder introduced into the upper portion of the chamber 30 passes in dispersed condition through zone 35 where it is commingled with finely atomized water discharged from nozzle 36. Also some saturated steam is introduced by way of nozzles 37. The particles acquire moisture whereby the material discharged on the lower conveyor 38 has a moisture content ranging from about 13 to 17% (total). The ratio between water and saturated steam is controlled to produce a desired average temperature within the treatment zone 35, which may be of the order of from 80° to 110° F.

As the particles of powder are commingled with the vapor and atomized water in zone 35, moisture is distributed on the surfaces of the particles whereby the particles acquire a surface stickiness. Sufficient commingling takes place within the treatment zone whereby the particles are brought into direct contact, with the result that the particles adhere together in the form of porous random aggregates. The time period of treatment in the equipment of FIGURE 3 may range from about 10 to 60 seconds. The aggregates discharged from the lower end of the equipment are relatively soft and porous and the bulk material has a puffed or fluffy appearance. The aggregates are deposited in an uncompacted mass on the endless belt conveyor 38, which serves to convey the material to a finishing dryer. The finishing dryer employed should be such that it does not cause any undue grinding or crushing of the aggregates. Suitable equipment for this purpose employs a screen provided with small perforations, which is vibrated to cause the material to progress from the feed to the discharge end of the same, and to apply vertical motion to maintain the powder as a loose working layer. In conjunction with the vibrating action, warm dry air is delivered upwardly through the screen to pass upwardly through the layer of powder. The number and size of the openings in the screen is so chosen in relation to the rate of air delivery therethrough that the powder moving along the screen is fluffed or levitated to form a layer several times the thickness it would normally have if at rest. By this technique the product is caused to progress along the screen and is at least partially supported by the cushion of air intermingled therewith. This provides drying action without rough or mechanical handling which might break up the aggergates.

The first phase of the finish drying can be with an inlet air temperature ranging from 180 to 225° F., and after the moisture content has been reduced to the value of the order of about 8% (total) the drying temperature can be increased to from 250 to 270° F., for a more rapid and efficient drying.

The final product produced by the above described instantizing method possesses good free flowing characteristics. The individual granules are in the form of porous aggregates, which have sufficient mechanical strength to permit packaging in cartons and marketing without undue development of fines. It can be readily intermixed and packaged with other ingredients, such as granulated cane sugar, cereal flour and the like. The particle size of the final product is such that the bulk of the material remains on a 100 mesh screen, but passes through a 20 mesh screen. The bulk density of the product ranges from about 230 to 300 grams per liter.

Although in most instances it is desirable to produce the egg white products free of other ingredients or additives, it is possible to provide additives such as flavoring or sweetening. Substantial amounts of lactose can be employed, with the production of stronger aggregates. Thus the spray dried powdered egg white material, produced from step 12, can be supplied to a mixing operation where it is dry mixed with a quantity of lactose powder. The amount of lactose added may vary from about 25 to 50% of the total mix. Preferably a minor part of the lactose powder is in crystalline form, that is in the form of alpha monohydrate. The remainder of the lactose can be in the anhydrous or amorphous form. With respect to the total amount of lactose powder employed, from 5 to 25% may be crystalline. When this dry mix is subjected to the instantizing method previously described, the presence of anhydrous lactose aids in bonding together the particles of the egg white particles adhered together along with sticky moistened lactose particles. When collected upon the conveyor 22, such aggregates can be subjected to a holding period before further drying ranging from 30 to 90 seconds, during which time the aggregates become firmer and less sticky. A substantial part of the lactose originally in the anhydrous form is caused to be hydrated and crystallized by the end of the holding period, which presumably accounts for the change to a firmer and less sticky form.

An egg white-lactose product as last described can be used in the same manner as the plain egg white product, except that the added lactose content must be taken into account where the product is used in special formulas. The incorporation of lactose does not affect the egg white in so far as denaturing of the protein is concerned.

Examples of our invention are as follows:

Example 1

Fresh raw egg white containing 9% solids was subjected to spray concentration in the manner previously described, by use of equipment similar to that shown in FIGURE 2, to produce a semi-fluid concentrate containing 32% solids. The inlet and outlet dry air temperatures were 225 and 105° F., with three passes through the equipment to obtain the desired concentration. The collected concentrate was then subjected to freezing to 0° F., to produce a preserved frozen concentrate. Upon thawing, this concentrate readily combined with water to form an egg white material having substantially the same characteristics (i.e. flavor, viscosity, whipping properties, etc.) as the original raw egg white. No detectable denaturing of protein could be noted.

Example 2

The concentrate produced by Example 1, without freezing, was subjected to spray drying in a commercial spray drying equipment of the type normally used for the spray drying of whole and skim milk. This equipment was equipped with a centrifugal atomizer. The product obtained was a dry powder having a particle fineness ranging from 10 to 200 microns. The majority of this powder passed through a 100 mesh screen, but would not pass through a 200 mesh screen. The powder had a bulk density of about 500 grams per liter. This dry powder had good keeping properties and remixed with water to form a reconstituted egg white, having substantially the same properties as the original raw material. Upon mixing with water, it was not subject to serious foaming.

Example 3

A quantity of the spray dried powder produced in accordance with Example 2, was subjected to instantizing by use of the equipment shown in FIGURE 3. The introduction of atomized water and saturated steam was controlled to produce an average temperature in zone 35 of about 100° F., and to produce aggregates discharging from the equipment with a moisture content of about 16% (total). The discharging material was deposited upon the endless belt conveyer 38, which transferred the material to the finish dryer. Material discharged by the conveyor 38, which was free flowing in character, was delivered to the first stage of a dryer constructed in the manner previously described. Drying air was supplied to the first dryer at a temperature of 225° F., and the drying continued in this stage to reduce the moisture content to about 7% (total). Thereafter the material was dried in similar equipment with the inlet temperature at a value of about 250° F., and such drying was continued to produce a final moisture content of about 5% (total). The product produced in accordance with this example had "instant" characteristics, particularly with respect to wettability and dispersibility. When a quantity of this instantized material is deposited upon the surface of water in a tumbler, the mass of material quickly wets and sinks below the surface. Thereafter simple stirring as by spoon served to rehydrate the material to form a colloidal solution substantially identical to raw egg white. The product obtained in accordance with this example had a bulk density of about 300 grams per liter, and a particle size such that the bulk of the material remained upon a 40 mesh screen, but passed through a 14 mesh screen.

Example 4

Dry powder obtained by Example 2 was mixed with an equal quantity by weight of lactose powder. One-half of this powder was in the anhydrous or amorphous form and the other half in the form of crystallized alpha monohydrate. The dry mix was then supplied continuously to the apparatus of FIGURE 3, and the introduction of atomized water and saturated steam controlled to produce an average temperature in zone 20 of about 110° F., and to provide aggregates discharging from the equipment with a moisture content of about 16% (total). The discharged material was deposited upon the endless belt conveyor 38, which transferred the material to the finish dryer with a holding time during transit of about 45 seconds, during which time the material became definitely less sticky and more firm. Drying of this material was the same as in Example 3. The final dry product had a bulk density of about 300 grams per liter and had a particle size such that the majority of the material passed through a 14 mesh screen but remained upon a 40 mesh screen.

Egg white products made as described above can be used for a variety of purposes. In general, when mixed with water, the reconstituted material is applicable to all uses to which egg white may be applied. Thus it can be used in the manfacture of various bakery products and confections. Assuming that the products are reconstituted to the same water content as the original raw egg white, the reconstituted material has the same viscosity, flavor and whipping properties and in general has all of the properties possessed by the original raw material. When in dry form the product can be used in cake and other dry premixes, together with sugar, flour and like ingredients, and it can be marketed either by itself or with other ingredients, to the domestic consumer trade.

We claim:

1. In a method for producing a preserved egg white product, the steps of continuously spraying raw egg white into a treatment zone to produce dispersed droplets ranging in size from about 10 to 200 microns, maintaining a hot drying gas in said zone whereby the moisture content of the droplets is substantially reduced by evaporation to a solids content of the order of from about 30 to 35%, collecting the droplets as a semifluid concentrate, atomizing the semifluid concentrate, causing the atomized droplets to be contacted with a hot drying gas whereby the droplets are converted to a coarse dry powder containing from about 5 to 12% moisture, and then collecting the dry powder as a dry egg white product.

2. A method as in claim 1 in which the dry powder is moistened while dispersed to render the particles sticky, the sticky particles caused to contact each other to form aggregates, and the aggregates thereafter subjected to drying for the removal of excess moisture.

3. A method as in claim 2 in which the dry powder before being moistened is dry mixed with lactose powder and thereafter said mixture subjected to said moistening, aggregating, and drying operation.

4. In a method for producing a preserved egg white product, the steps of continuously spraying raw egg white in a treatment zone to produce dispersed droplets ranging in size from about 10 to 200 microns, maintaining a hot drying gas in said zone whereby the moisture content of the droplets is substantially reduced to a solids content of the order of from about 30 to 35%, collecting the droplets as a semifluid concentrate, spray drying the concentrate to form a coarse dry powdered egg white product containing from 5 to 12% moisture, passing the dry powder through a treatment zone in dispersed condition, supplying moisture to said zone whereby powder particles are moistened and caused to adhere together in the form of random aggregates containing from about 13 to 17% moisture, said zone being maintained at a temperature of from about 80 to 110° F., and then subjecting the moist aggregates to drying to form a final instantized dry egg white product.

5. In a method for producing an egg white product, the steps of continuously spraying raw egg white into a treatment zone to produce disperse droplets ranging in size from about 10 to 200 microns, maintaining a hot drying gas in said zone whereby the moisture content of the droplets is substantially reduced by evaporation to a solids content to the order of from about 30 to 35%, and then collecting the droplets as a semi-fluid concentrate.

6. A method as in claim 5 in which the concentrate is frozen to form a preserved product.

References Cited in the file of this patent

UNITED STATES PATENTS

| | | |
|---|---|---|
| 1,183,098 | Merrell et al. | May 16, 1916 |
| 1,639,549 | Bellamy | Aug. 16, 1927 |
| 2,377,644 | Parsons et al. | June 5, 1945 |
| 2,610,918 | Kline et al. | Sept. 16, 1952 |
| 2,900,256 | Scott | Aug. 18, 1959 |

UNITED STATES PATENT OFFICE
CERTIFICATE OF CORRECTION

Patent No. 3,062,665                                    November 6, 1962

David D. Peebles et al.

It is hereby certified that error appears in the above numbered patent requiring correction and that the said Letters Patent should read as corrected below.

In the grant, lines 2 and 3, and 13, and in the heading to the printed specification, line 5, for "Formost Daries, Inc." read -- Foremost Dairies, Inc. --.

Signed and sealed this 4th day of June 1963.

(SEAL)
Attest:

ERNEST W. SWIDER                                  DAVID L. LADD
Attesting Officer                                      Commissioner of Patents